United States Patent
Codilian et al.

(10) Patent No.: US 8,307,156 B1
(45) Date of Patent: Nov. 6, 2012

(54) ADAPTIVELY MODIFYING PRE-READ OPERATIONS WITHIN A ROTATING MEDIA STORAGE DEVICE

(75) Inventors: Raffi Codilian, Irvine, CA (US); Gregory B. Thelin, Garden Grove, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/952,088

(22) Filed: Nov. 22, 2010

Related U.S. Application Data

(63) Continuation of application No. 10/209,825, filed on Jul. 31, 2002, now abandoned.

(51) Int. Cl.
*G06F 12/00* (2006.01)

(52) U.S. Cl. ............ 711/113; 711/4; 711/137; 711/154; 711/E12.004; 360/75; 360/78.04

(58) Field of Classification Search .................. None
See application file for complete search history.

(56) References Cited

U.S. PATENT DOCUMENTS

| | | | |
|---|---|---|---|
| 5,727,232 A | 3/1998 | Iida et al. | |
| 5,768,226 A | 6/1998 | Ogino | |
| 5,812,755 A | 9/1998 | Kool et al. | |
| 5,896,540 A | 4/1999 | Asano et al. | |
| 6,085,287 A * | 7/2000 | O'Neil et al. | 711/113 |
| 6,092,149 A * | 7/2000 | Hicken et al. | 711/113 |
| 6,782,449 B1 | 8/2004 | Codilian et al. | |
| 6,795,262 B1 | 9/2004 | Codilian et al. | |
| 2002/0174293 A1 | 11/2002 | Fox et al. | |
| 2003/0041214 A1 | 2/2003 | Hirao et al. | |
| 2003/0123354 A1 | 7/2003 | Takahashi | |
| 2003/0145164 A1* | 7/2003 | Hoskins et al. | 711/112 |
| 2003/0177314 A1 | 9/2003 | Grimsrud et al. | |

* cited by examiner

*Primary Examiner* — Michael Krofcheck

(57) ABSTRACT

A rotating media storage device (RMSD) that adaptively modifies pre-read operations is disclosed. The RMSD schedules a pre-read data segment on a second track of disk, commands a movable head to seek to the second track, and if an on-track condition is not met for the scheduled pre-read data segment, modifies the pre-read operation. In one example, modifying the pre-read operation includes canceling the pre-read operation and then performing a read data operation.

9 Claims, 9 Drawing Sheets

ADAPTIVELY MODIFYING PRE-READ OPERATIONS WITHIN A ROTATING MEDIA STORAGE DEVICE

CLAIM OF PRIORITY

This application is a continuation of application Ser. No. 10/209,825, filed Jul. 31, 2002.

BACKGROUND OF THE INVENTION

1. Field of the Invention

The present invention relates to rotating media storage devices (RMSDs). More particularly, the present invention relates to an RMSD that adaptively modifies pre-read operations in order to optimize data throughput.

2. Description of the Prior Art and Related Information

Computer systems rely on rotating media storage devices (RMSDs), which often employ a moveable head actuator to frequently access large amounts of data stored on the media. One example of an RMSD is a hard disk drive. One critical aspect of designing a RMSD in an extremely competitive market is its performance, typically measured by benchmark programs. The benchmark programs measure, among other things, the time required to perform a series of data transfer commands such as read commands. The time required to execute a given command is dependent on several factors including mechanical latency, cache size, and the efficiency of cache management.

One key aspect of mechanical latency in a RMSD is media rotational speed. In a competitive environment, products such as disk drives at a comparable price point offer comparable rotational speeds. Another aspect of mechanical latency is seek time, which generally measures the time required to move a head actuator from a current position to a target position. The seek time is determined by the mechanical characteristics of the head actuator, sometimes termed head stack assembly, and a seek profile which defines, during the time the actuator is accelerated and decelerated en route to the target position, an instantaneous desired velocity or acceleration/deceleration designed to achieve an efficient and predictable arrival of the head supported by the actuator over the target position on the media. Disk drive makers work diligently to improve the mechanics of the head stack assembly and the seek profile used to manage the seek operation. Nevertheless, disk drives at comparable price points tend to exhibit similar seek time characteristics.

In an effort to overcome limitations imposed by mechanical latency, disk drives have employed cache memory to reduce command execution time by providing host computer requested data from a cache memory, rather than from the disk directly. This technique is useful because oftentimes requested data is data that is repetitive or sequential with previously requested data. The disk drive, having anticipated such requests, is able to furnish data from a semiconductor memory and thus avoids mechanical latency. The process of reading data which is sequential with host requested data may involve reading data which precedes the host-requested data (pre-read) and data which follows the host-requested data (post-read). Utilizing these types of read caching algorithms improves data throughput.

However, in today's pre-read caching schemes, the pre-read data is initially treated as desired pre-read data and once it is determined that it is accessible to be read it becomes committed pre-read data. Unfortunately, during a seek to read operation, if the head has not settled on the committed pre-readable sectors in time (such that the pre-read data can be read), a full rotation of the disk is required so that the head can return to read the committed pre-read data.

Looking at FIG. 1A, FIG. 1A shows an example of a standard read caching algorithm having committed pre-read data that is in common use today. Data 10 is read along Track-1 and a seek command to Track-2 to read data is received at point 12. Consequent to this event, the time to seek to the second track is calculated. The read caching algorithm typically performs a post-read 14 along Track-1 and a seek is initiated at point 13. Line 15 illustrates the moveable head of the RMSD moving from Track-1 to Track-2. Particularly, as line 15 illustrates, the moveable head seeks and settles to Track-2. A read condition is then met such that the seek and settle operation is complete and an on-track condition is declared at point 16. The read caching algorithm then typically performs a pre-read 17 on Track-2 and then further proceeds to read the desired read data 18. As previously discussed, by performing the post-read 14 and further the pre-read 17, and reading this data into semiconductor memory, the overall data throughput can be improved.

Turning now to FIG. 1B, FIG. 1B shows another example of a standard read caching algorithm having committed pre-read data that is in common use today. However, this example shows a typical variation in which there is a scheduled pre-read data segment that is forecasted, upon which the reading of the committed pre-read data is to start. Again, data 10 is read along Track-1 and a seek command to Track-2 to read data is received at point 12. Consequent to this event, the time to seek to the second track is calculated. The read caching algorithm typically performs a post-read 14 along Track-1 and a seek is initiated at point 13. Line 15 illustrates the moveable head of the RMSD moving from Track-1 to Track-2. Particularly, as line 15 illustrates, the moveable head seeks and settles Track-2. A read condition is then met such that the seek and settle operation is complete and then an on-track condition is declared at point 16. As can be seen in FIG. 1B, the seek is complete at point 16, before the scheduled pre-read data segment 21, such that reading can begin at the forecasted scheduled pre-read data segment 21. The read caching algorithm then typically performs a pre-read 17 on Track-2 starting at the scheduled pre-read data segment 21 and then further proceeds to read the desired read data 18.

However, even in the previously described scheduled pre-read data segment case, the committed pre-read data is still required to be read and if the head has not settled on the committed pre-read data by the scheduled pre-read data segment point, then a full rotation of the disk has to pass so that the head can eventually return to read the committed pre-read data. As previously discussed, caching data before the desired target read data, utilizing a pre-read, can help drive performance—especially in competitive drive performance tests. However, making the pre-read mandatory often backfires because sometimes longer than expected settling times occur. Unfortunately, when this occurs, and the head has not fully settled on the track when the targeted pre-read data arrives (e.g. scheduled pre-read data segment 21), then the drive has to wait for an additional disk rotation so that the head can return to settle on the committed pre-read data segment. This has the deleterious effect of slowing down the drive performance.

An example of this is shown in FIG. 1C. Referring now to FIG. 1C, FIG. 1C shows yet another example of a standard read caching algorithm having committed pre-read data that is in common use today and further shows a missed scheduled pre-read data segment resulting in a wasted disk revolution. Here, data 10 is read along Track-1 and a seek command to Track-2 to read data is received at point 12. Consequent to this event, the time to seek to the second track is calculated. The read caching algorithm typically performs a post-read 14 along Track-1 and a seek is initiated at point 13 based on the calculated time to seek to the second track. Line 15 illustrates the moveable head of the RMSD moving from Track-1 to Track-2.

However, as is often the case, the moveable head does not settle on the required Track-2 until point 16 (at which point reading can begin), which is after the scheduled pre-read data segment 21. Thus, an on-track condition is not met until after the forecasted scheduled pre-read data segment 21. Unfortunately, the missed data of the committed pre-read portion 17 still needs to be read and the disk of the RMSD must perform another revolution to capture the missed committed pre-read data. This results in an entirely wasted revolution of the disk and seriously degrades the data throughput of the RMSD.

SUMMARY OF THE INVENTION

The present invention relates to adaptively modifying pre-read operations within a rotating media storage device (RMSD) to optimize data throughput.

In one aspect, the invention may be regarded as a RMSD connected to a host computer. The RMSD includes a disk having at least a first track and a second track, a moveable head, a cache memory and a microprocessor for controlling operations in the RMSD including seek operations and read operations that include pre-read operations to read pre-read data, read operations for reading read data, and post-read operations to read post-read data. The microprocessor under the control of a program: schedules a forecasted pre-read data segment on the second track; commands the moveable head seek to the second track; and if an on-track condition is not met for the scheduled pre-read data segment, the microprocessor modifies the pre-read operation. In one embodiment, modifying the pre-read operation includes canceling the pre-read operation and then performing the read data operation to read the read data. On the other hand, if the on-track condition is met for the scheduled pre-read data segment, the pre-read operation is performed.

In a more particular aspect, the invention may be regarded as a RMSD connected to a host computer that utilizes even more detailed steps in modifying the pre-read operation. As previously discussed, the RMSD is connected to a host computer. The RMSD includes a disk having at least a first track and a second track, a moveable head, a cache memory and a microprocessor for controlling operations in the RMSD including seek operations and read operations that include pre-read operations to read pre-read data, read operations for reading read data, and post-read operations to read post-read data. The microprocessor under the control of a program schedules a forecasted pre-read data segment on the second track and commands the moveable head seek to the second track. If an on-track condition is not met for the scheduled pre-read data segment, the microprocessor determines if the pre-read operation is still performable for a remaining portion of the pre-read data segment before the start of the read data operation. If the microprocessor determines that the entire pre-read data segment cannot be read, the microprocessor modifies the pre-read operation. In one embodiment, modifying the pre-read operation includes canceling the pre-read operation and then performing the read data operation to read a read data segment. However, if the pre-read operation is determined to be performable for the remaining portion of the pre-read data segment, before the start of the read operation to read the read data segment, the pre-read operation is performed for the remaining portion of the pre-read data segment. On the other hand, if the on-track condition is met for the scheduled pre-read data segment, the pre-read operation is simply performed for the scheduled pre-read data segment.

In still another aspect, the invention may also be regarded as a method for a RMSD to efficiently switch between a read operation on a first track of a disk and a read operation on a second track of the disk. The method comprises the steps of: scheduling a forecasted pre-read data segment on the second track; seeking to the second track; and if an on-track condition is not met for the scheduled pre-read data segment, modifying the pre-read operation.

In yet another aspect, the invention may further be regarded as a system having a host computer and an RMSD. The RMSD includes a disk having at least a first track and a second track, a moveable head, a cache memory and a microprocessor for controlling operations in the RMSD including seek operations and read operations that include pre-read operations to read pre-read data, read operations for reading read data, and post-read operations to read post-read data. The microprocessor under the control of a program: schedules a forecasted pre-read data segment on the second track; commands the moveable head seek to the second track; and if an on-track condition is not met for the scheduled pre-read data segment, the microprocessor modifies the pre-read operation.

The foregoing and other features of the invention are described in detail below and set forth in the appended claims.

DETAILED DESCRIPTION

Figure 1A:
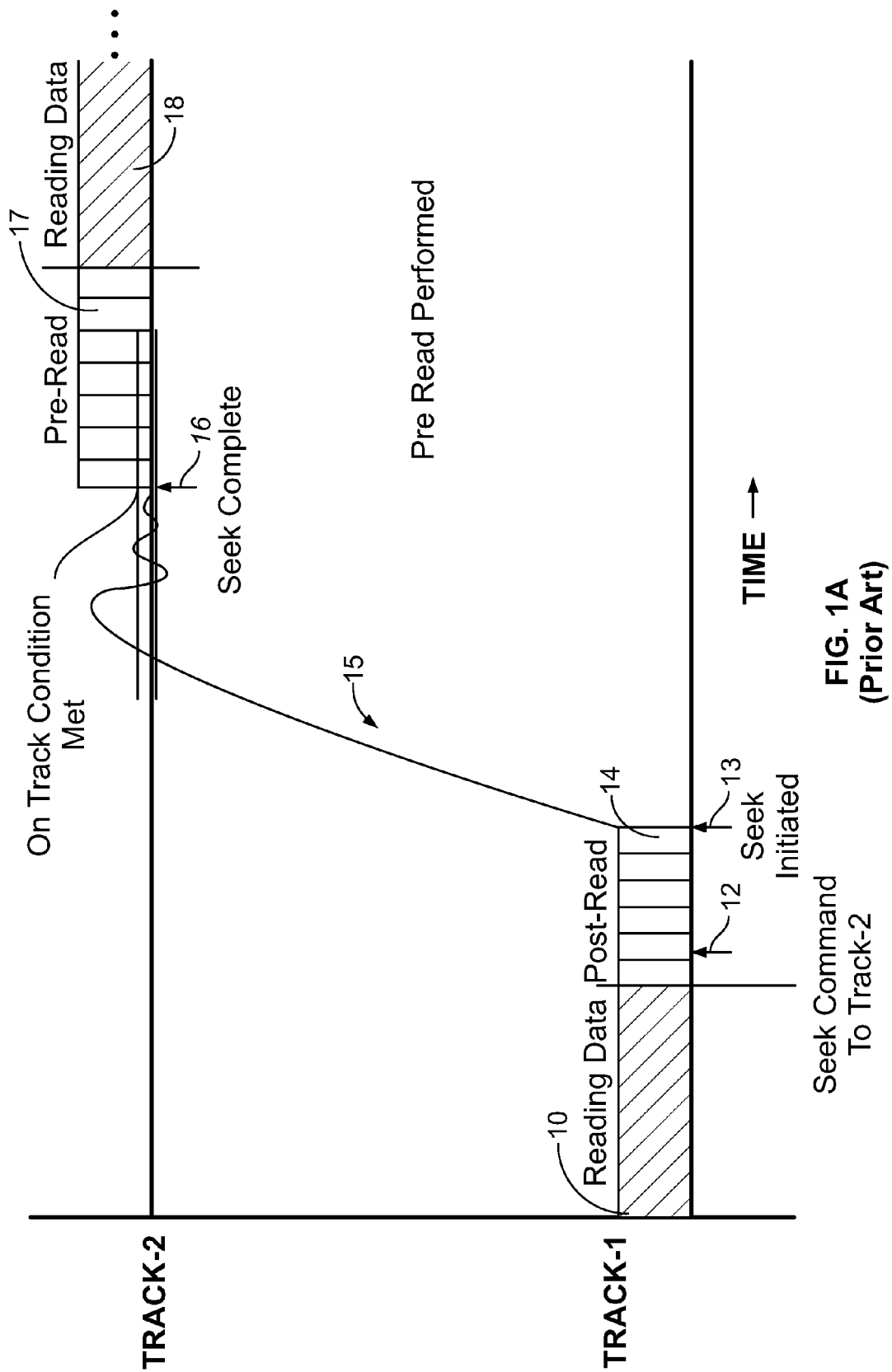
FIG. 1A shows an example of a standard read caching algorithm having committed pre-read data that is in common use today.
Figure 1B:
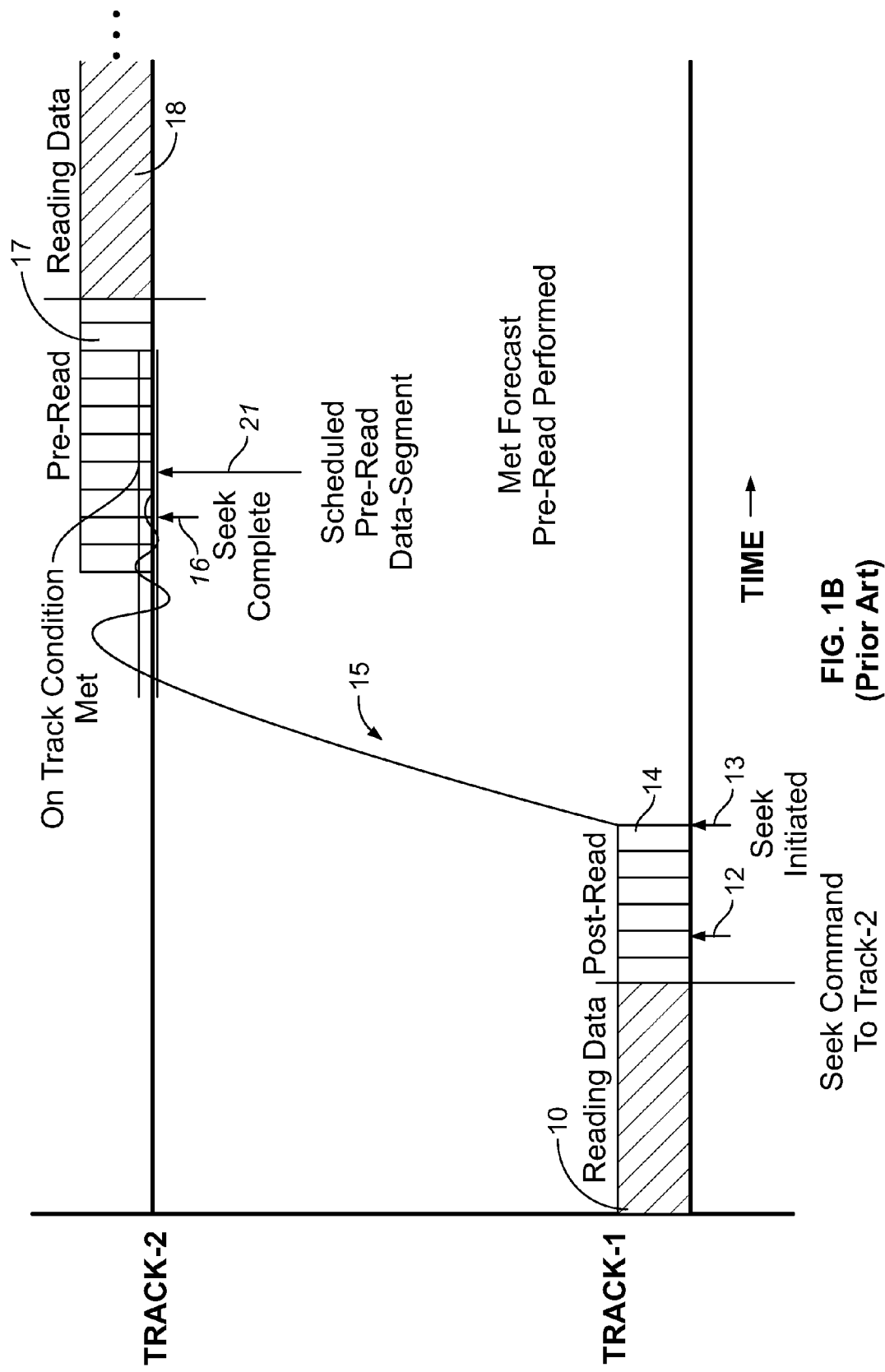
FIG. 1B shows another example of a standard read caching algorithm having committed pre-read data that is in common use today.
Figure 1C:
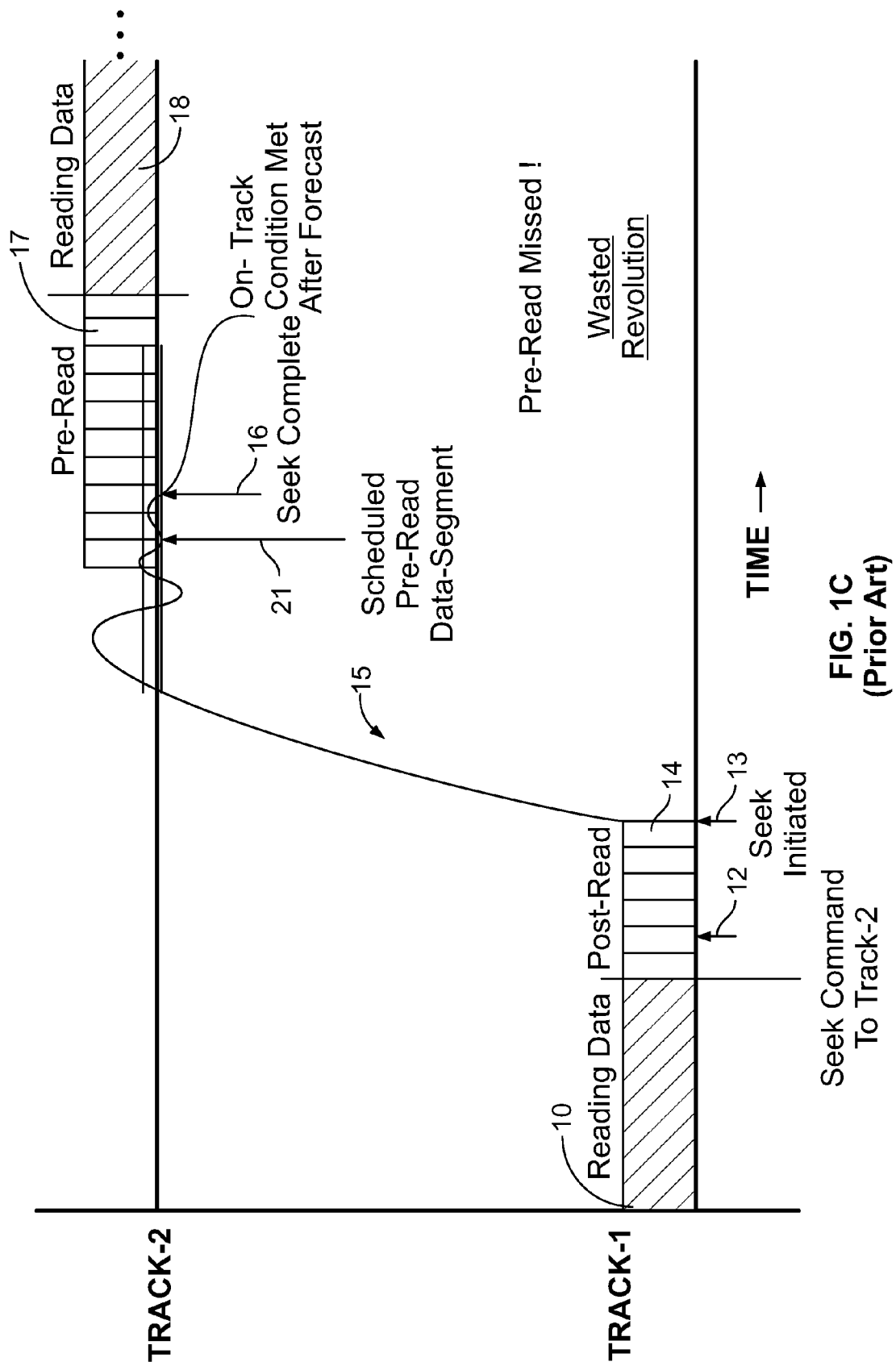
FIG. 1C shows yet another example of a standard read caching algorithm having committed pre-read data that is in common use today and further shows a missed scheduled pre-read data segment resulting in a wasted disk revolution.
Figure 2:
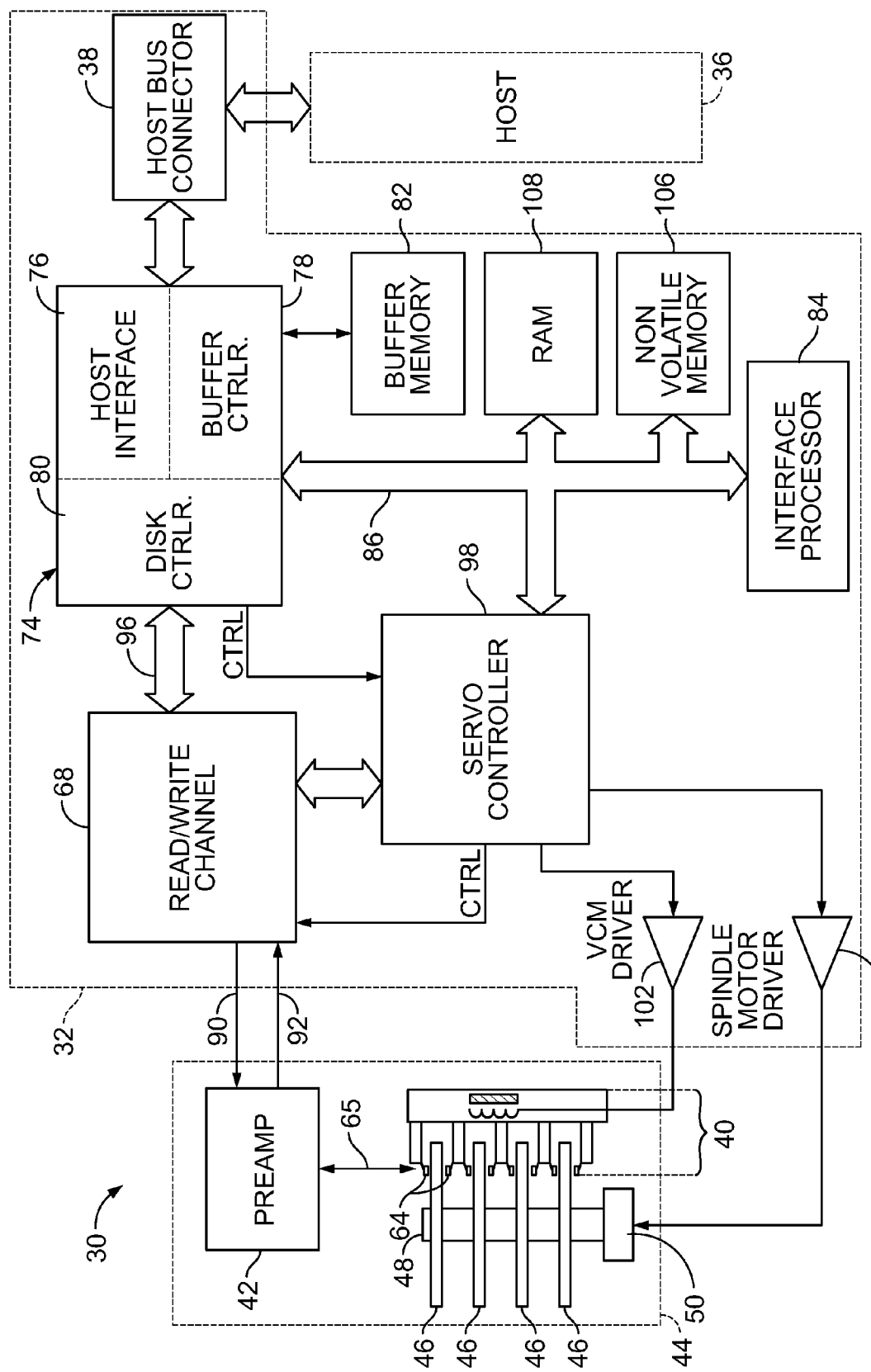
FIG. 2 shows a block diagram of a rotating media storage device (RMSD), such as a disk drive, in which the invention may be practiced.

FIG. 2 shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

HDA 34 comprises: one or more disks 46 for data storage; a spindle motor 50 for rapidly spinning each disk 46 (four shown) on a spindle 48; and an actuator assembly 40 for swinging a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular, as described in detail below, microprocessor 84 under the control of a program or routine executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

The present invention adaptively modifies pre-read operations within a RMSD to optimize data throughput. As previously discussed, the disk drive 30 includes at least one disk 46 having a first track and a second track, a moveable head 64, a cache memory 82, and a microprocessor 84 for controlling operations in the disk drive 30 including seek operations and read operations that include pre-read operations to read pre-read data, read operations for reading read data, and post-read operations to read post-read data. Particularly, the microprocessor 84 under the control of a program: schedules a forecasted pre-read data segment on the second track; commands the moveable head to seek to the second track; and if an on-track condition is not met for the scheduled pre-read data segment modifies the pre-read operation. In one embodiment, modifying the pre-read operation includes canceling the pre-read operation and then performing the read data operation to read the read data. However, if the on-track condition is met for the scheduled pre-read data segment, the pre-read operation is simply performed. It should be appreciated that many of the method steps to be hereinafter described are implemented by the microprocessor 84 operating under the control of a program.

Figure 3:
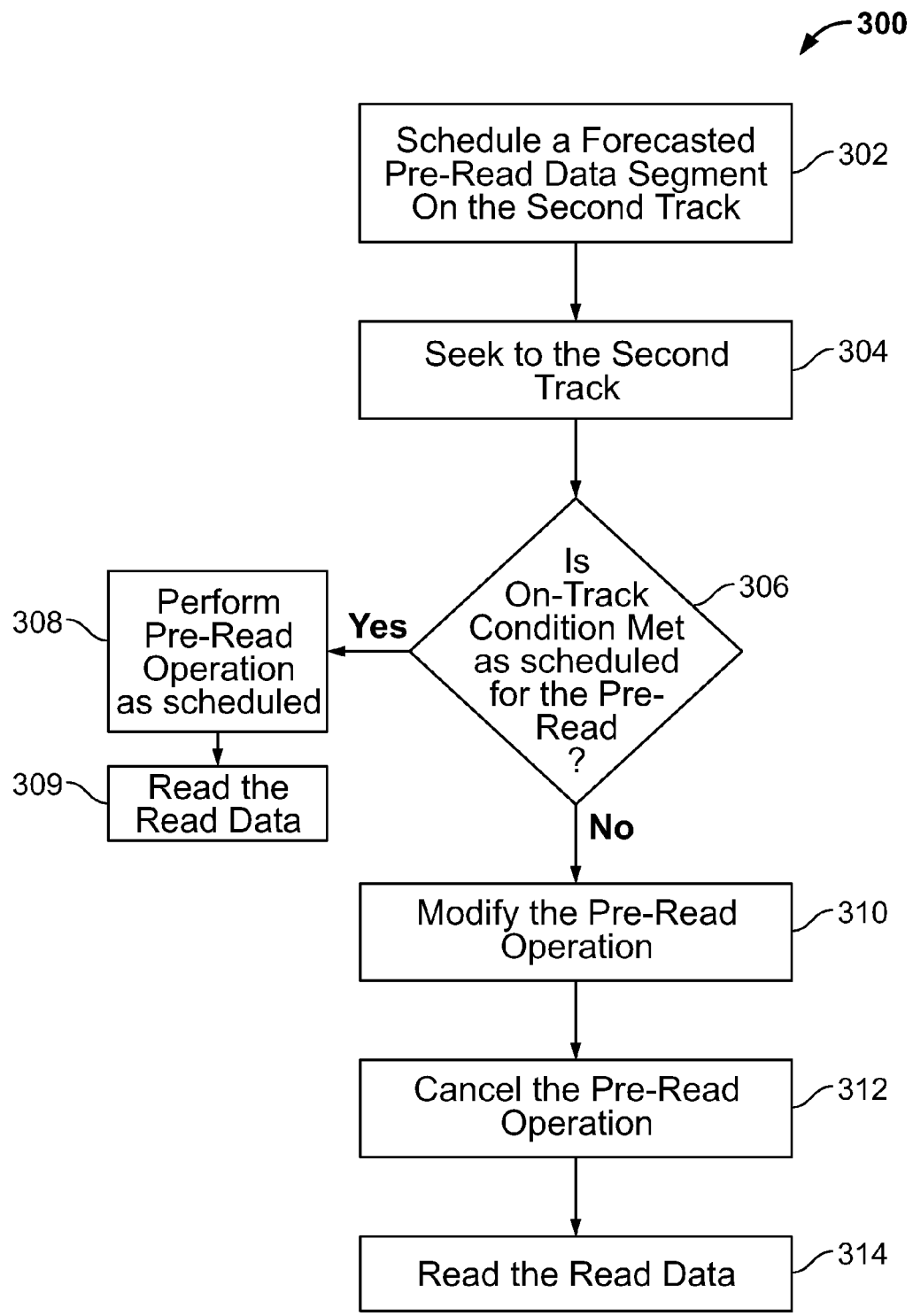
FIG. 3 shows a flowchart of a method of the invention for adaptively modifying pre-read operations.

Now turning to FIG. 3, a flowchart of a method 300 of the invention for adaptively modifying pre-read operations is illustrated. At step 302, the method schedules a forecasted pre-read data segment on the second track. Next, at step 304, the moveable head is commanded to seek to the second track. At step 306, it is determined whether or not an on-track condition is met for the scheduled pre-read data segment as scheduled.

If the on-track condition is met for the scheduled pre-read data segment, then at step 308, the pre-read operation is performed as scheduled. Next, at step 309, the read data is read. On the other hand, if the on-track condition is not met for the scheduled pre-read data segment, then at step 310 the pre-read operation is modified. In one embodiment, the pre-read operation is modified such that at step 312 the pre-read operation is canceled and at step 314 the disk drive instead performs the read data operation to read the read data.

Figure 4:
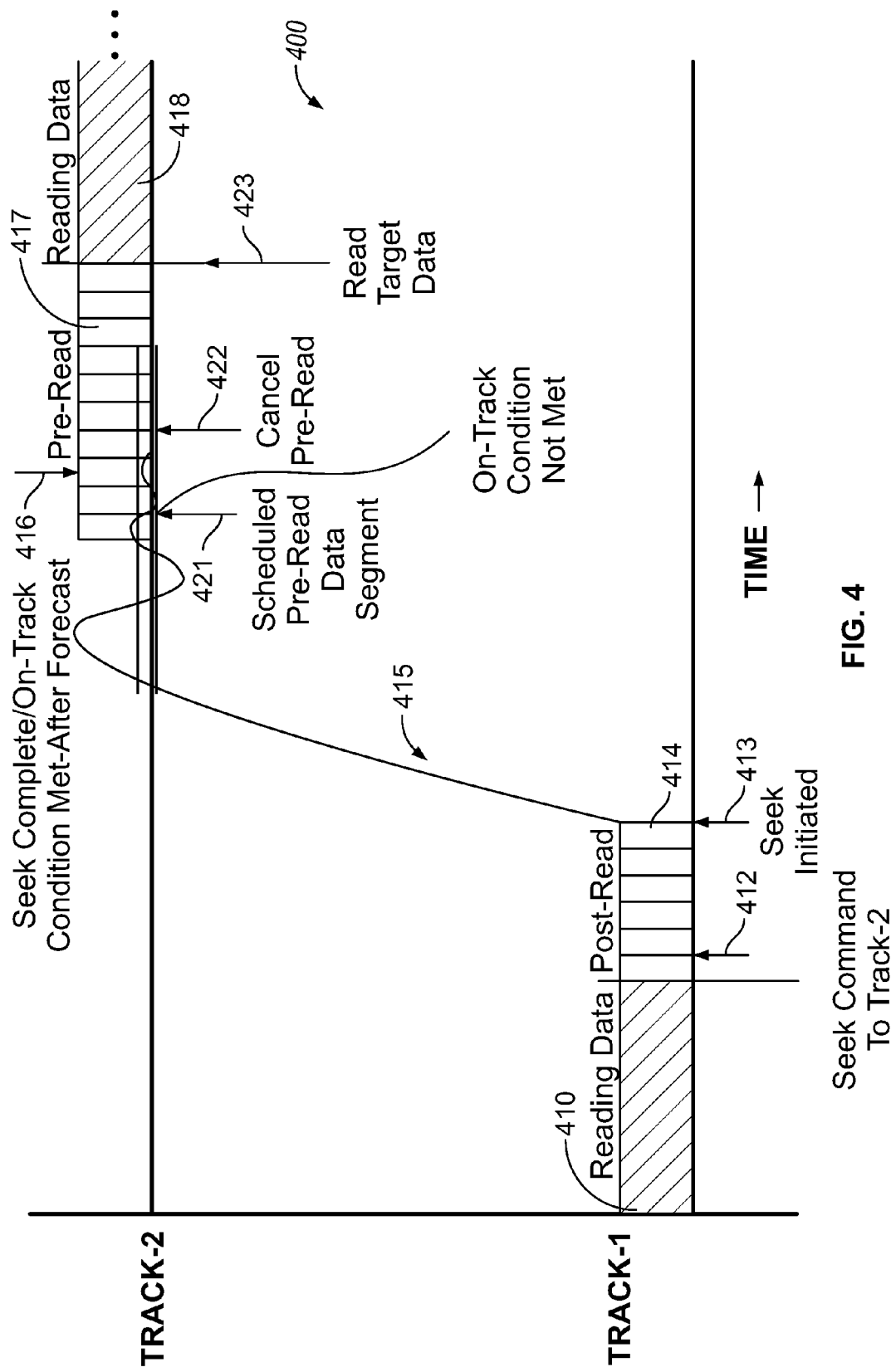
FIG. 4 shows a diagram illustrating an example of a modified pre-read operation.

Referring now to FIG. 4, a diagram illustrating an example of a modified pre-read operation 400 is shown. Here, data 410 is read along Track-1 and a seek command to Track-2 to read data is received at point 412. Consequent to this event, a read access time to the second track is estimated and a forecasted pre-read data segment on the second track is scheduled. After performing the post-read 414, a seek is initiated at point 413. Line 415 illustrates the head 64 of the disk drive 30 moving from Track-1 to Track-2. Particularly, line 415 illustrates that the head 64 while seeking and settling to Track-2 does not settle in time to the scheduled pre-read data segment 421. Thus, an on-track condition is not met for the scheduled pre-read data segment 421. Instead, the moveable head does not settle (i.e. such that an on-track condition is met), until after the scheduled the pre-read data segment, at point 416.

In this case, the microprocessor 84 under the control of a program modifies the pre-read operation such that at point 422 the pre-read operation is canceled. Thus, the pre-read data 417 is not read. Instead, the microprocessor 84 commands the moveable head to start reading the read data at point 423. At this point the read data operation reads the read data 418. Accordingly, the pre-read operation to read the pre-read data 417 is simply skipped and the moveable head just starts reading the read data 418, since it has already seeked and settled to Track-2. In this way, whereas prior methods that require the reading of committed pre-read data would simply wait for an additional rotation of the disk to then read the committed pre-read data, the present method simply skips the pre-read data and reads the read target data and does not waste an additional rotation of the disk. Thus, data throughput is optimized.

Figure 5A:
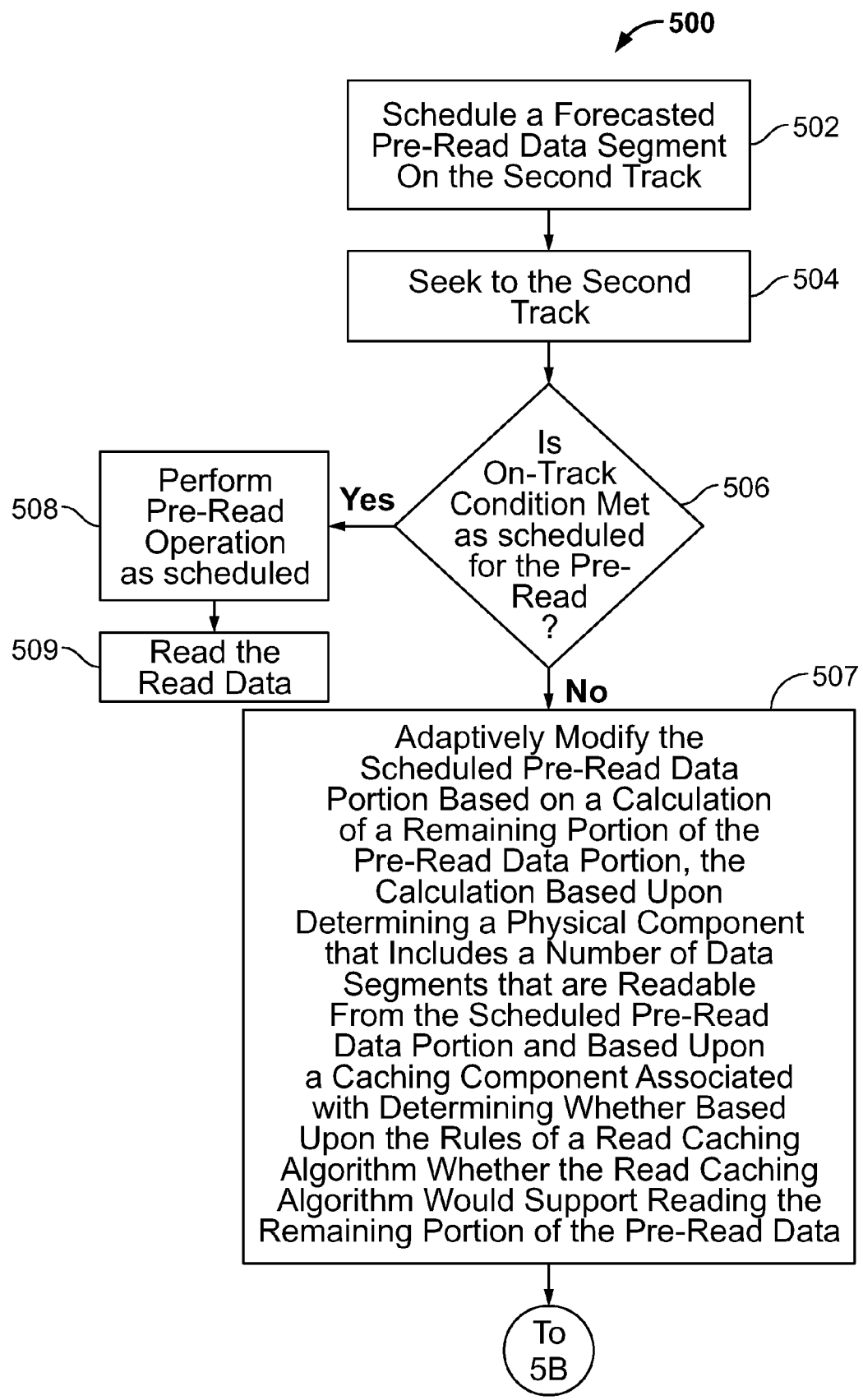
FIG. 5A shows a flowchart of another embodiment of the method of the invention for adaptively modifying pre-read operations.
Figure 5B:
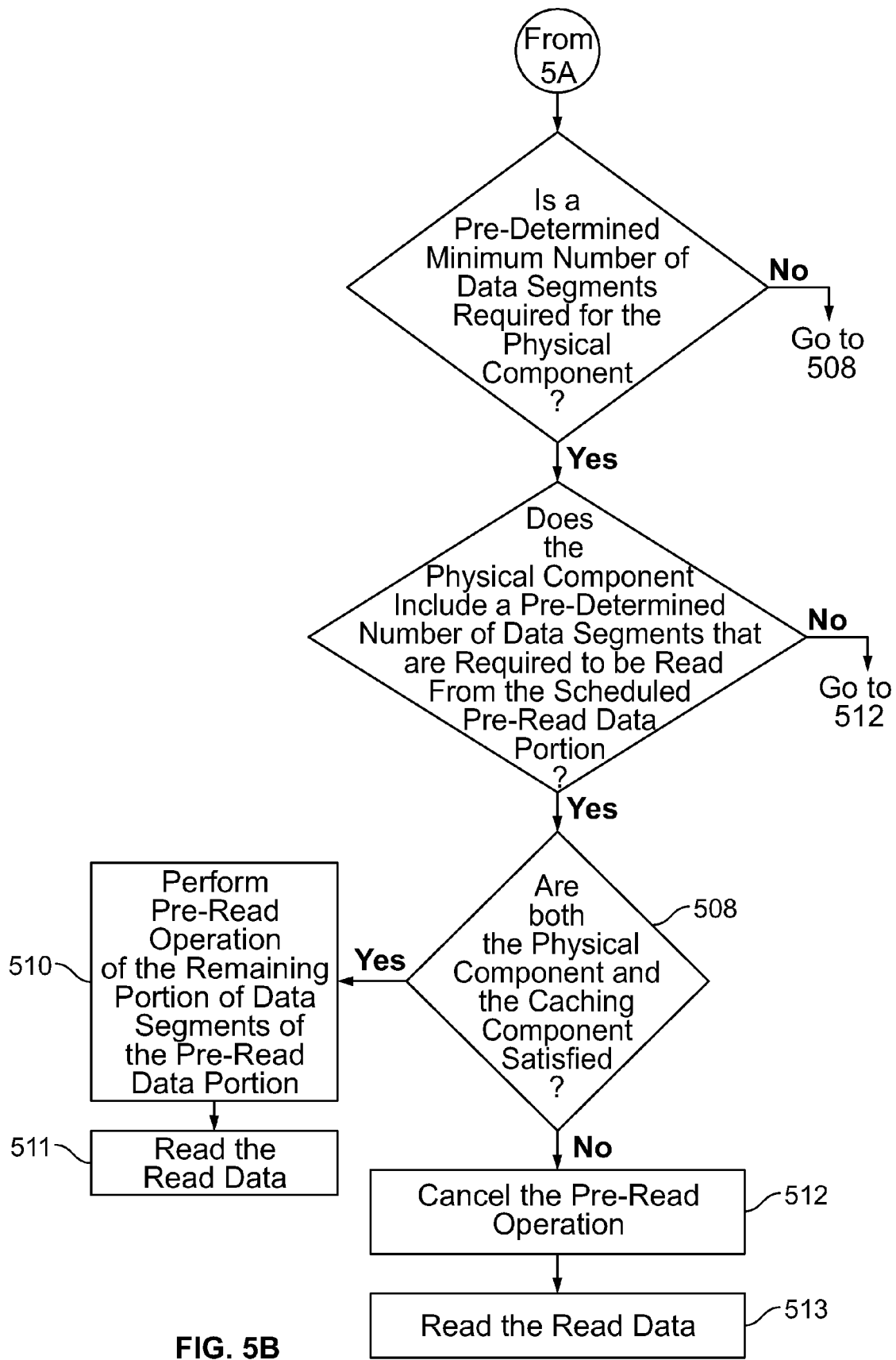
FIG. 5B shows a flow chart of another embodiment of the method of the invention for adaptively modifying pre-read operations.

Turning now to FIGS. 5A and 5B, a flowchart of another embodiment of the method 500 of the invention for adaptively modifying pre-read operations is illustrated. At step 502 the method schedules a forecasted pre-read data segment on the second track. Next, at step 504 the microprocessor 84 commands the moveable head 64 to seek to the second track. At step 506, the method determines whether or not an on-track condition has been met for the scheduled pre-read data segment as scheduled. If the on-track condition for the scheduled pre-read data segment has been met, then at step 508 the pre-read operation is preformed for the scheduled pre-read data segment as scheduled. Next, at step 509, the read data is read.

On the other hand, if it is determined that the on-track condition has not been met for the scheduled pre-read data segment, than at step 507 the pre-read operation is modified. Particularly, in one embodiment, modifying the pre-read operation includes determining whether or not any portion of the pre-read is still to be performed. For example, in one embodiment, this determination can be made based on at least two factors, physical factors and caching factors (steps 550, 552). Firstly, as to physical factors, this relates to whether or not there is enough time for the moveable head to settle on the track such that a minimum number of pre-read data segments can still be read. Secondly, as to caching factors, even if a minimum number of pre-read data segments can still physically be read, it next has to be determined whether based on the rules of the particular read caching algorithm being utilized whether or not the read caching algorithm would still support reading the remaining portion of the pre-read data (e.g. whether coherency factors are met). If both the physical and caching factors are satisfied at step 551, then the remaining portion of the pre-read data can be read. Thus, if it is determined that any portion of the pre-read is still to be performed, before the start of the read operation to read the read data segment, then at step 510 the pre-read operation for the remaining portion of the pre-read data segment is preformed. Next, at step 511, the read data is read.

However, if it is determined that the remaining portion of the pre-read data is not be performed, then at step 512 the pre-read operation is canceled. In this case, the modification of the pre-read operation includes canceling the pre-read operation and then at step 513 performing the read data operation to read the read data as previously discussed with reference to FIG. 4.

Figure 6:
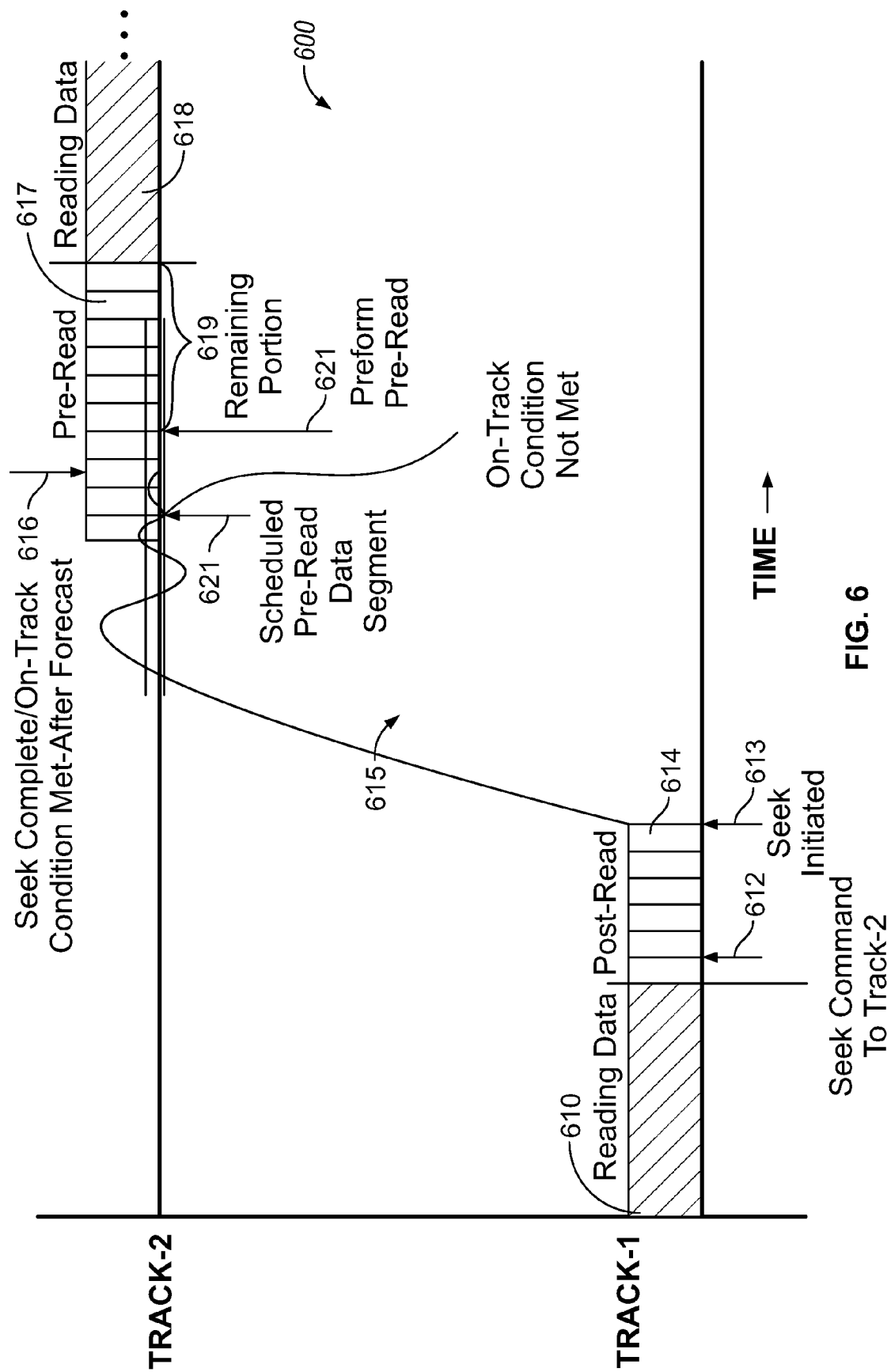
FIG. 6 shows a diagram illustrating another example of a modified pre-read operation.

Referring now to FIG. 6, a diagram illustrating a modified pre-read operation 600 is shown. Here, data 610 is read along Track-1 and a seek command to Track-2 to read data is received at point 612. Consequent to this event, a read access time to the second track is estimated and a forecasted pre-read data segment on the second track is scheduled. Next, the post-read data 614 is read and a seek is initiated at point 613. At point 613 the microprocessor 84 commands the moveable head to 64 to seek to the second track. Line 615 illustrates the moveable head of the disk drive head 30 moving from Track-1 to Track-2.

As shown in FIG. 6, the moveable head seeks and settles to the second track at point 616 such that an on-track condition is met, however, this is after the scheduled pre-read data segment 621. Thus, an on-track condition is not met for the scheduled pre-read data segment 621.

Consequent to the on-track condition being met at point 616, the microprocessor 84 determines that the on-track condition was not met for the scheduled pre-read data segment 621. The microprocessor 84 then determines whether the pre-read operation is still performable for a remaining portion 619 of the pre-read data segment before the start of the read data operation. As shown in FIG. 6, it is determined that the pre-read operation is still performable for the remaining portion 619 of the pre-read data segment and, at point 621, the microprocessor 84 commands the moveable head to read the remaining portion 619 of the pre-read data segment 617. After this, the moveable head 64 then reads the read data 618 and continues on with further processing. Accordingly, even though the scheduled pre-read data segment 621 was missed, instead of waiting for an additional disk rotation to read the committed pre-read data as in current disk drives, the present invention instead determines that it can still read a remaining portion of the pre-read data, reads the remaining portion of the pre-read data that it can, and then continues to read the target read data. In this way, an additional rotation of the disk is not wasted and data transfer to and from the disk is optimized.

In summary, the present invention may be regarded as an RMSD, e.g. a disk drive, that adaptively modifies pre-read operations to optimize data throughput. In the disk drive example, the disk drive includes a disk having at least a first track and a second track, a moveable head, a cache memory, and a microprocessor for controlling operations in the disk drive including seek operations and read operations that include pre-read operations to read pre-read data, read operations for reading read data, and post-read operations for reading post-read data. The microprocessor under the control of a program schedules a forecasted pre-read data segment on the second track, commands the moveable head to seek to the second track, and if an on-track condition is not met for the scheduled pre-read data segment, modifies the pre-read operation. Particularly, when the on-track condition is not met for the scheduled pre-read data segment, modifying the pre-read operation includes canceling the pre-read operation and then performing the read data operation to read the read data. On the other hand, if the on-track condition is met for the scheduled pre-read data segment, the pre-read operation is simply performed.

Numerous alternative methods for RMSDs with similar or other media format characteristics can be employed by those skilled in the art to use the invention with equal advantage to modify a read caching algorithm (e.g. particularly pre-read operations) in order to optimize data throughput. Further, although the embodiments have been described in the context of a disk drive with embedded servo sectors, the invention can be employed in may different types of RMSDs having a head actuator scanning the media.

We claim:

1. A rotating media storage device (RMSD) connectable to a host computer, the RMSD comprising:
   a disk including at least a first track and a second track;
   a moveable head;
   a cache memory to store data segments from the disk that have been previously read; and
   a microprocessor for controlling operations in the RMSD including seek operations and read operations that include pre-read operations to read pre-read data, read data operations for reading read data, and post-read operations to read post-read data, wherein the reading of the pre-read data is adaptively modified such that a remaining portion of data segments of the pre-read data is read and the read data and the post-read data are read, within one disk drive revolution, the microprocessor under the control of a program to:
   a. schedule a forecasted pre-read data portion on the second track, wherein the scheduled pre-read data portion includes a plurality of data segments;
   b. command the moveable head to seek to the second track;
   c. determine if an on-track condition is physically met for the scheduled pre-read data portion based upon servo position information from a servo controller, and if so, perform the pre-read operation for the scheduled pre-read data portion; and
   d. determine if the on-track condition cannot be met for the scheduled pre-read data portion based upon servo position information from a servo controller, and if not, adaptively modify the scheduled pre-read data portion based on a calculation of a remaining portion of the scheduled pre-read data portion to be read based upon servo position information from the servo controller that determines a physical component that includes a number of data segments that are readable from the scheduled pre-read data portion and based upon a caching component associated with determining whether, based upon rules of a read caching algorithm that determine if coherency factors are met, the read caching algorithm would support reading the remaining portion of the pre-read data, wherein if both the physical component and the caching component are satisfied, the remaining portion of data segments of the scheduled pre-read data portion is read and the read data and the post-read data are read, within one disk drive revolution.

2. The RMSD of claim 1, wherein, if the physical component or the caching component is not satisfied, adaptively modifying the scheduled pre-read data portion includes canceling the pre-read operation and then performing the read data operation to read the read data.

3. The RMSD of claim 1, wherein, the physical component includes a pre-determined minimum number of data segments that are required to be read from the scheduled pre-read data portion.

4. In a rotating media storage device (RMSD) connectable to a host computer, the RMSD having a disk including at least a first track and a second track, a moveable head, a servo controller, a cache memory to store data segments from the disk that have been previously read and a microprocessor for controlling operations in the RMSD including seek operations and read operations that include pre-read operations to read pre-read data, read data operations for reading read data, and post-read operations to read post-read data, wherein the reading of the pre-read data is adaptively modified such that a remaining portion of data segments of the pre-read data is read and the read data and the post-read data are read, within one disk drive revolution, a method of efficiently switching between a read operation on the first track and a read operation on the second track, the method comprising the steps of:
  a. scheduling a forecasted pre-read data portion on the second track, wherein the scheduled pre-read data portion includes a plurality of data segments;
  b. commanding the moveable head to seek to the second track;
  c. determining if an on-track condition is physically met for the scheduled pre-read data portion based upon servo position information from the servo controller, and if so, performing the pre-read operation for the scheduled pre-read data portion; and
  d. determining if the on-track condition cannot be met for the scheduled pre-read data portion based upon servo position information from the servo controller, and if not, adaptively modifying the scheduled pre-read data portion based on a calculation of a remaining portion of the scheduled pre-read data portion to be read based upon servo position information from the servo controller that determines a physical component that includes a number of data segments that are readable from the scheduled pre-read data portion and based upon a caching component associated with determining whether, based upon rules of a read caching algorithm that determine if coherency factors are met, the read caching algorithm would support reading the remaining portion of the pre-read data, wherein if both the physical component and the caching component are satisfied, the remaining portion of data segments of the scheduled pre-read data portion is read and the read data and the post-read data are read, within one disk drive revolution.

5. The method of claim 4, wherein, if the physical component or the caching component is not satisfied, adaptively modifying the scheduled pre-read data portion includes canceling the pre-read operation and then performing the read data operation to read the read data.

6. The method of claim 4, wherein, the physical component includes a pre-determined minimum number of data segments that are required to be read from the scheduled pre-read data portion.

7. A computer system comprising a host computer and a rotating media storage device (RMSD), the RMSD further comprising:
  a disk including at least a first track and a second track;
  a moveable head;
  a cache memory to store data segments from the disk that have been previously read; and
  a microprocessor for controlling operations in the RMSD including seek operations and read operations that include pre-read operations to read pre-read data, read data operations for reading read data, and post-read operations to read post-read data, wherein the reading of the pre-read data is adaptively modified such that a remaining portion of data segments of the pre-read data is read and the read data and the post-read data are read, within one disk drive revolution, the microprocessor under the control of a program to:
  a. schedule a forecasted pre-read data portion on the second track, wherein the scheduled pre-read data portion includes a plurality of data segments;
  b. command the moveable head to seek to the second track;
  c. determine if an on-track condition is physically met for the scheduled pre-read data portion based upon servo position information from a servo controller, and if so, perform the pre-read operation for the scheduled pre-read data portion; and
  d. determine if the on-track condition cannot be met for the scheduled pre-read data portion based upon servo position information from a servo controller, and if not, adaptively modify the scheduled pre-read data portion based on a calculation of a remaining portion of the scheduled pre-read data portion to be read based upon servo position information from the servo controller that determines a physical component that includes a number of data segments that are readable from the scheduled pre-read data portion and based upon a caching component associated with determining whether, based upon rules of a read caching algorithm that determine if coherency factors are met, the read caching algorithm would support reading the remaining portion of the pre-read data, wherein if both the physical component and the caching component are satisfied, the remaining portion of data segments of the scheduled pre-read data portion is read and the read data and the post-read data are read, within one disk drive revolution.

8. The RMSD of claim 7, wherein, if the physical component or the caching component is not satisfied, adaptively modifying the scheduled pre-read data portion includes canceling the pre-read operation and then performing the read data operation to read the read data.

9. The RMSD of claim 1, wherein, the physical component includes a pre-determined minimum number of data segments that are required to be read from the scheduled pre-read data portion.

* * * * *